A. M. LEONI.
SAFETY TRANSMISSION DEVICE.
APPLICATION FILED JULY 23, 1910.
990,757.
Patented Apr. 25, 1911.
2 SHEETS—SHEET 1.
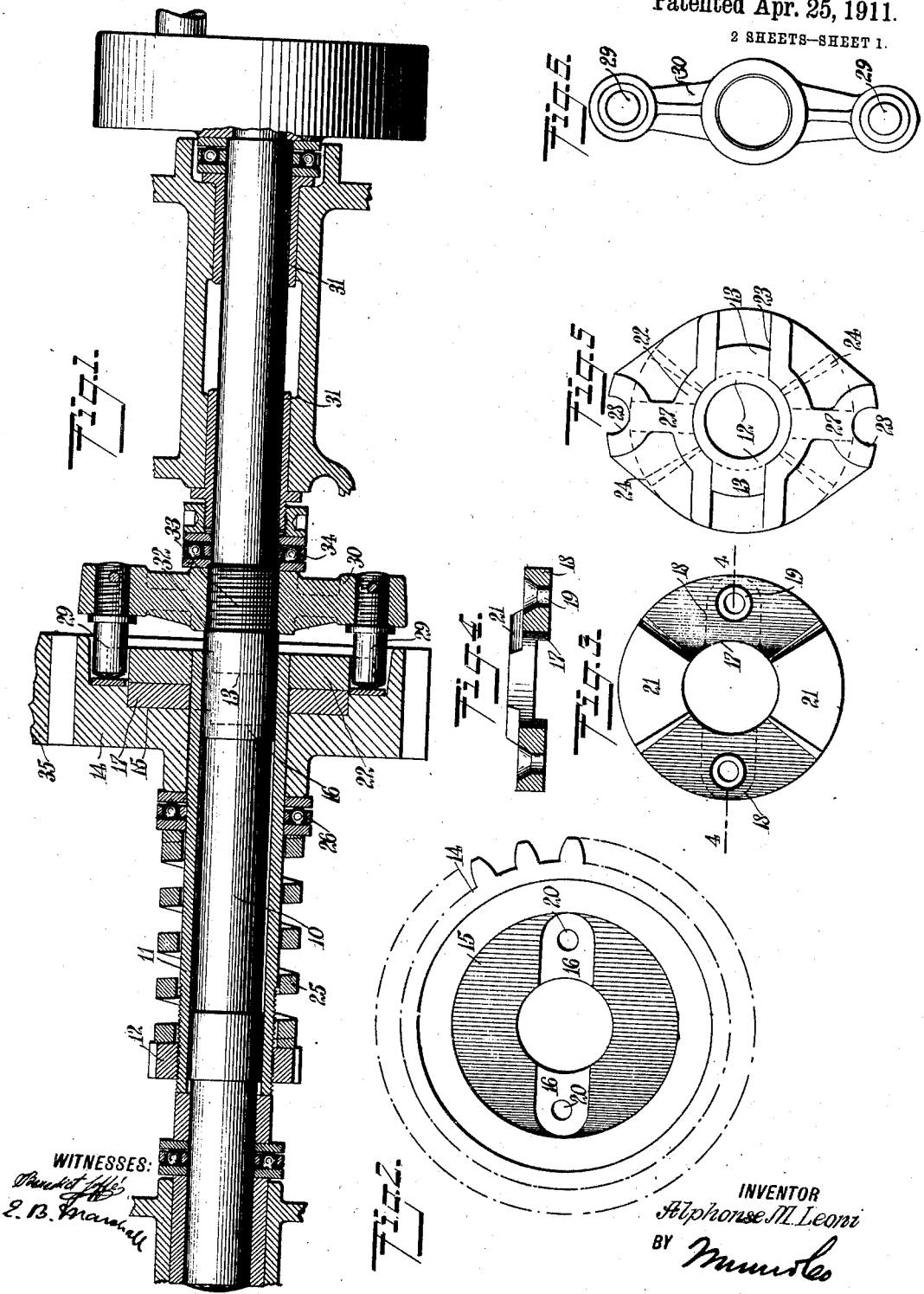
WITNESSES:
INVENTOR
Alphonse M. Leoni
BY
ATTORNEYS

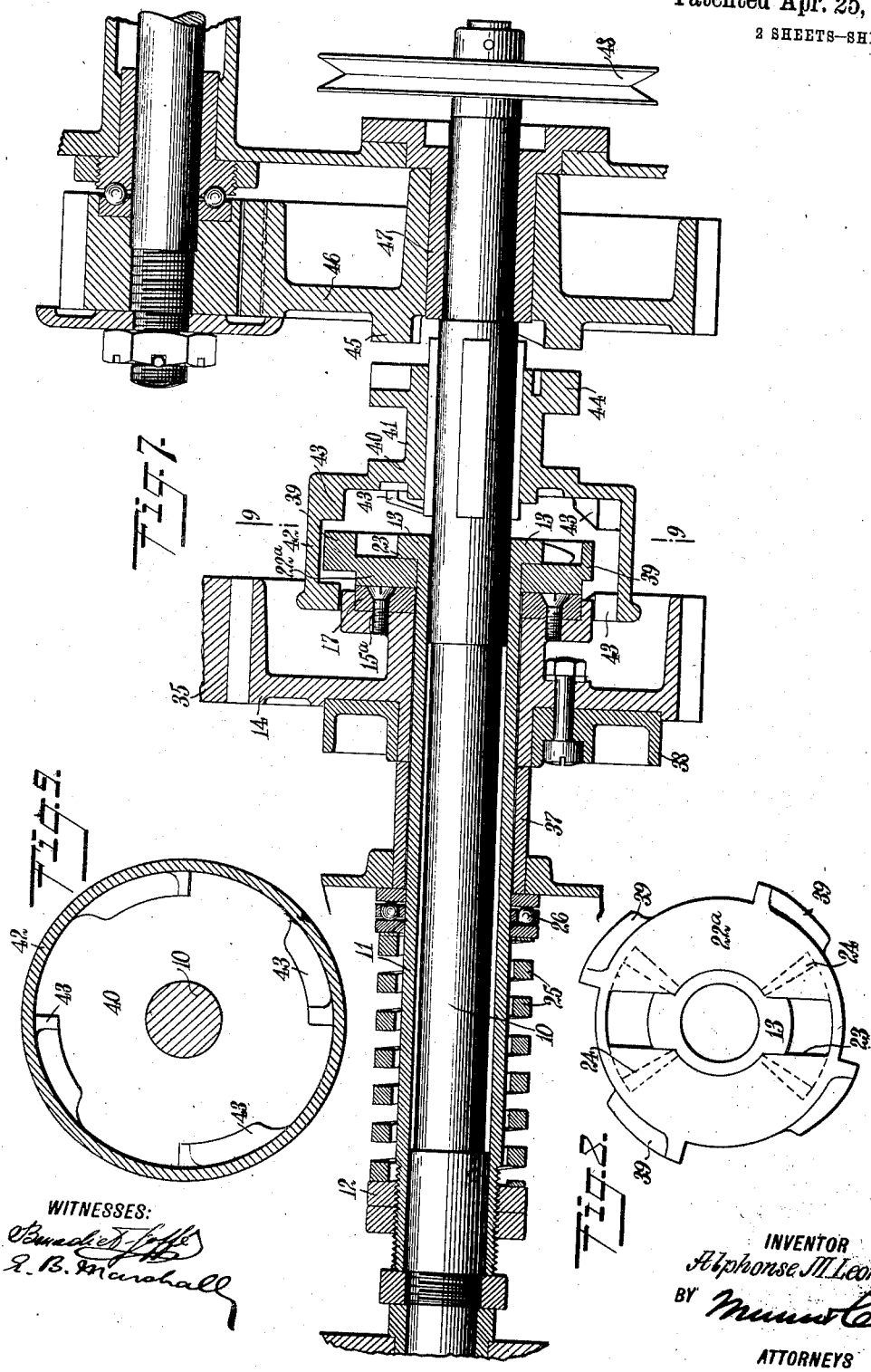

UNITED STATES PATENT OFFICE.

ALPHONSE MARIA LEONI, OF NEW YORK, N. Y., ASSIGNOR TO THE AGRICULTURAL MACHINES IMPROVEMENT COMPANY, OF NEW YORK, N. Y.

SAFETY TRANSMISSION DEVICE.

990,757.

Specification of Letters Patent.  Patented Apr. 25, 1911.

Application filed July 23, 1910. Serial No. 573,484.

*To all whom it may concern:*

Be it known that I, ALPHONSE M. LEONI, a subject of the King of Italy, and a resident of the city of New York, borough of Manhattan, in the county and State of New York, have invented a new and Improved Safety Transmission Device for Motor Mowing-Machines, of which the following is a full, clear, and exact description.

My invention relates to transmission gears for use on mowing machines, and it is an improvement on the structures disclosed in my United States Patents Nos. 919,039 and 919,040, both issued on April 20, 1909.

An object of this invention is to provide an efficient and durable mechanism which will permit the driving member to rotate relatively to the driven member when the engine is subjected to a sudden and unusual load.

Another object of the invention is to provide two members having openings, in which a shaft is disposed, one of the members having projections with inclined sides, normally disposed in recesses in the other member, the recesses having inclined walls, there being means by which one of the members is adjusted for rotating the shaft and means for holding the two members yieldingly together.

Still another object of the invention is to provide a hollow shaft with ears which are normally disposed in recesses in the outer face of one of the engaging members, there being a collar on the hollow shaft and a spring disposed around the hollow shaft, abutting against the collar and pressing the two members together.

Further objects of the invention are: to provide a member which is secured to, and which extends from, the main shaft, to which pins are secured which engage seats in one of the two engaging members; and to provide a clutch member keyed to the shaft, which may be used to connect one of the two engaging members with a wheel disposed concentrically with the main shaft and free to rotate relatively thereto.

Still other objects of the invention will appear in the following complete description.

In this specification I will describe the preferred form of my invention, it being understood that the scope of the invention is defined in the appended claims.

Reference is to be had to the accompanying drawings forming a part of this specification, in which similar characters of reference indicate corresponding parts in all the views, and in which—

Figure 1 is a longitudinal sectional elevation of the invention; Fig. 2 is a view of the gear wheel, showing the recess therein; Fig. 3 is a view of the member secured to the gear wheel in the recess; Fig. 4 is a sectional view on the line 4—4 of Fig. 3; Fig. 5 is a view showing the member mounted on the hollow shaft and engaged by the ears thereon; Fig. 6 is a view showing the arm secured to the main shaft; Fig. 7 is a sectional view showing a modified form of the invention; Fig. 8 is a view showing the member mounted on the hollow shaft and engaged by the ears thereon, and Fig. 9 is a sectional view of the clutch member, on the line 9—9 of Fig. 7.

By referring to the drawings, it will be seen that a main shaft 10 is provided, on which is disposed a hollow shaft 11 having a collar 12 and ears 13, the collar 12 being spaced at a distance from the said ears. Mounted freely on the hollow shaft 11, there is a gear wheel 14, having a cut-away portion 15 in its outer face and radially-disposed recesses 16 connected therewith. A member 17 is disposed in the cutaway portion 15 in the gear wheel 14, this member 17 having radially-disposed lugs 18 which are disposed in the recesses 16, the member 17 being held firmly in the cutaway portion 15 by means of screws which are disposed in orifices 19 in the member 17, the screws meshing in threaded orifices 20 in the gear wheel 14. This member 17 has, on its outer face, sector-shaped projections 21, the sides of which are inclined. A member 22 is also mounted on the hollow shaft 11, this member 22 having recesses 23 in its outer face, in which are disposed the ears 13, which are secured to the hollow shaft 11. This member 22 also has, on its inner face, sector-shaped recesses 24, the side walls of which are inclined, the sector-shaped projections 21 on the member 17, being adapted to fit in the sector-shaped openings 24 in the member 22. A spring 25 is mounted on the hollow shaft 11 between the collar 12 and the gear wheel 14, bearing members 26 being disposed between the said spring 25 and the said gear wheel 14. As the spring 25 tends to push the gear wheel 14 to the right, and as the hollow shaft 11 is thrust to the left by means of the spring 25, which presses against the collar 12 mounted on the said hollow shaft, the ears 13 on the hollow shaft 11 tend to press the member 22 against the member 17, so that the projections 21 will be normally disposed in the recesses 24. To the member 22, there are also secured radially disposed arms 27, having open seats 28 at their terminals, in which are disposed pins 29 secured to a radially-disposed member 30 which, in turn, is secured to the shaft 10. These pins 29 are held in position between the open seats 28 and the inner wall of the gear wheel 14. There is a shoulder 32 on the shaft 10, the shaft 10 being threaded at 33 to the right of the said shoulder, and the member 30 has an opening with an inner thread, which meshes with the thread 33, so that the member 30 may be turned home on the thread and against the shoulder 32 in the direction opposite to that in which the shaft 10 will be normally rotated. The shaft 10 is journaled in bearings 31, and thrust bearing members 34 are provided for holding the member 30 against the shoulder 32.

In using the invention, the gear wheel 14 is driven by gear 35, and, as the gear wheel 14 rotates, it carries with it the member 17 and, in turn, this member 17 causes the member 22 to rotate, inasmuch as the projections 21 are held in the recesses 24 by means of the spring 25, together with the mechanism described. As the member 22 rotates, it causes the hollow shaft to rotate by means of the ears 13, which are disposed in the recesses 23 in the said member 22, and the main shaft 10 is also caused to rotate by means of the pins 29, which are seated in the seats 28 in the member 22 and which are secured to the member 30 which, in turn, is secured to the main shaft 10. In this way, the rotation of the gear wheel 14 will cause the main shaft 10 to rotate until the motor is subjected to a sudden and unusual load. When this takes place, the spring 25 will yield and will permit the gear wheel 14 and the member 17 to rotate relatively to the member 22, the hollow shaft 11 and the main shaft 10, and injury to the gearing will be prevented.

In the modification, shown in Figs. 7, 8 and 9 of the drawings, a similar gear wheel 14 is provided, which is rotated by the gear 35, this gear wheel 14 being mounted on a hollow shaft 11, in which the main shaft 10 is disposed, this hollow shaft 11 being provided with the ears 13 and the collar 12. However, in this modified form, the bearing members 26 are separated from the gear wheel 14 by a collar 37 and an eccentric 38, which may be used to operate machinery; but it should be understood that this eccentric is not a feature of the present invention. The member 17 is secured in a recess 15$^a$ in the gear wheel 14, in the manner described with reference to the form of my invention shown in Figs. 1 to 6 of the drawings, this member 17 being engaged by a member 22$^a$, which is provided with the recesses 23 and 24, which have been described, the ears 13 on the hollow shaft 11 being disposed in the recesses 23, and the projections on the member 17 being normally disposed in the recesses 24. However, this member 22$^a$ is also provided with wing members 39 on its periphery, the said wing members 39 being disposed obliquely relatively to the plane of the member 22$^a$. Keyed to the main shaft 10, there is a clutch member 40, this clutch member 40 being adapted to be moved longitudinally relatively to the said main shaft and being provided with a groove 41, in which may be disposed a fork, or other device, by which it may be shifted and may be held in position. This clutch member 40 has a member 42, which spans the wings 39, there being wings 43 on the said member 42, which are disposed at each side of the wings 39, these wings 43 being disposed obliquely relatively to the plane of rotation of the clutch member 40, so that they will be engaged readily by the wings 39 on the member 22$^a$. The clutch member 40 also has wing, or teeth, members 44, adapted for engaging wing, or teeth, members 45 on a wheel 46, mounted freely on the main shaft 10, or, if desired, as shown in the drawings, this wheel 46, which may be a gear wheel, may be mounted on a bearing member 47 in which the shaft 10 is journaled. When this modified form of the invention is used, the member 22$^a$ may be driven by the gearing 35 in the manner described, and when the clutch member 40 is moved to the extreme right, or left, it will be engaged by the wings 39 on the member 22$^a$, so that the main shaft 10 will be driven thereby. When this clutch member 40 is moved to the right, it will not only rotate the main shaft 10, but the wing, or teeth members 42 thereon will engage the wing, or teeth, members 45 on the wheel 46, so that the said wheel 46 will be rotated thereby. However, when the clutch member 40 is moved to the left, while it will still rotate the main shaft 10, it will not rotate the gear wheel 46. With this modified form of the invention, it is possible to drive machinery by a pulley, such as the pulley 48, secured to the main shaft, for rotating the gear wheel 46, while, at the same time, it is possible to throw the clutch member 40, so that not only the shaft 10 will be rotated, but the gear wheel 46 will also be caused to rotate. In either case, the spring 25, with the mechanism described, will hold the members 17 and 22$^a$ yieldingly together to transmit the power until a sudden or unusual load is put upon it, when the member 17, with the gear wheel 14, will be permitted to rotate relatively to the member 22ª, the clutch member 40 and the main shaft 10.

Having thus described my invention, I claim as new and desire to secure by Letters Patent:

1. In a transmission gearing, a hollow shaft, a shaft disposed therein, a wheel free to rotate on the hollow shaft, having a member with projections on its face, a member having recesses in one of its faces, in which the said projections are normally disposed, mounted on the hollow shaft, means by which the second-mentioned member is rotated with the hollow shaft, a member secured to rotate with the second-mentioned shaft, means connecting the second-mentioned member with the third-mentioned member, and means for holding the wheel and the second-mentioned member yieldingly with the said projections disposed in the said recesses.

2. In a transmission gearing, a hollow shaft, a shaft disposed therein, a wheel having recesses in one of its faces, free to rotate on the hollow shaft, a member having projections on its opposite faces, mounted on the hollow shaft, the projections on one side of the said member being disposed in the recesses in the wheel, means for securing the member to the wheel, a second member, having recesses in one of its faces, in which the projections on the other face of the first member are normally disposed, means by which the second-mentioned member is rotated with the hollow shaft, a member secured to rotate with the second shaft, means connecting the second-mentioned member with the third member, and means for holding the gear wheel and the second-mentioned member yieldingly with the projections on the said other face of the first-mentioned member disposed in the recesses in the second-mentioned member.

3. In a transmission gearing, a wheel having an opening therethrough and a member with projections on its face, a member having an opening therethrough and recesses in one of its faces, in which the said projections are normally disposed, a shaft disposed through the said openings, a member secured to rotate with the shaft, means by which the second-mentioned member is adapted for rotating the third member, and means for holding the gear wheel and the second-mentioned member yieldingly, with the projections in the first member disposed in the recesses in the second member.

4. In a transmission gearing, a shaft, a hollow shaft having ears and a collar, in which the first shaft is disposed, a wheel and a member on its face, mounted freely on the hollow shaft, between the ears and the collar, a second member mounted on the hollow shaft, between the member on the wheel and the ears, means by which the second-mentioned member is attached for rotating the first-mentioned shaft, and a spring disposed between the collar and the wheel, for holding the two members in engagement with each other.

5. In a transmission gearing, a shaft, a hollow shaft having ears and a collar, in which the first-mentioned shaft is disposed, a wheel and a member on its face, mounted freely on the hollow shaft, between the ears and the collar, a second member mounted on the hollow shaft, between the member on the wheel and the ears, means by which the second-mentioned member is adapted for rotating the hollow shaft, means by which the second-mentioned member is adapted for rotating the first-mentioned shaft, and a spring disposed between the collar and the wheel, for holding the two members in engagement with each other.

6. In a transmission gearing, a shaft, a hollow shaft having ears and a collar, in which the first shaft is disposed, a wheel mounted freely on the hollow shaft, between the ears and the collar, a member, secured to a face of the wheel, having projections with inclined edges, a second member having recesses with inclined side walls, in which the said projections are normally disposed, mounted on the hollow shaft, between the member on the gear wheel and the ears, means by which the second-mentioned member is adapted for rotating the first-mentioned shaft, and a spring, disposed between the collar and the wheel, for holding the two members yieldingly in engagement with each other.

7. In a transmission gearing, a shaft, a hollow shaft having ears and a collar, in which the first shaft is disposed, a wheel and a member on its face, mounted freely on the hollow shaft, between the ears and the collar, a second member having recesses, in which the projections on the first-mentioned member are normally disposed, mounted on the hollow shaft, between the member on the wheel and the ears, there being recesses in the outer face of the second-mentioned member, in which the ears are disposed, means by which the second-mentioned member is adapted for rotating the first-mentioned shaft, and a spring, disposed between the collar and the wheel, for holding the two members in engagement with each other.

8. In a transmission gearing, a shaft, a hollow shaft having ears and a collar, in which the first-mentioned shaft is disposed, a wheel and a member on its face, mounted freely on the hollow shaft, between the ears and the collar, a second member mounted on the hollow shaft, between the member on the wheel and the ears, a third member secured to rotate with, and extending from, the first-mentioned shaft, means by which the second-mentioned member is adapted for engaging the third-mentioned member to rotate it, and a spring disposed between the collar and the wheel, for holding the first two-mentioned members in engagement with each other.

9. In a transmission gearing, a shaft, a hollow shaft having ears and a collar, in which the first-mentioned shaft is disposed, a wheel mounted freely on the hollow shaft, between the ears and the collar, a member secured to a face of the wheel, in the direction of the ears, having projections with inclined edges, a second member having recesses with inclined walls, in which the said projections are normally disposed, mounted on the hollow shaft, between the member on the wheel and the ears, arms having seats, secured to the second-mentioned member, a third member secured to the first-mentioned shaft, pins on the third-mentioned member, which are disposed in the seats of the second-mentioned member, and a spring disposed between the collar and the wheel, for holding the first two-mentioned members in engagement with each other.

10. In a transmission gearing, a shaft, a hollow shaft having ears and a collar, in which the first-mentioned shaft is disposed, a wheel having a recess in its face, in the direction of the ears, mounted freely on the hollow shaft, between the collar and the ears, a member disposed in the recess and secured to the wheel, a second member mounted on the hollow shaft in the said recess and engaging the first-mentioned member, arms having open seats at their terminals, secured to the second-mentioned member and disposed in the recess, a third member secured to rotate with, and extending from, the first-mentioned shaft, a pin secured to the third-mentioned member and disposed between the seats and the wall of the recess, and a spring disposed between the collar and the wheel, for holding the first two-mentioned members in engagement with each other.

11. In a transmission gearing, a shaft, a hollow shaft having ears and a collar, in which the first-mentioned shaft is disposed, a wheel having a recess in its face, disposed in the direction of the ears, mounted freely on the hollow shaft, between the collar and the ears, a member disposed in the recess and secured to the wheel, a second member mounted on the hollow shaft in the recess and engaging the first-mentioned member, there being recesses in the outer face of the second-mentioned member, in which the ears are disposed, arms having open seats at their terminals, secured to the second-mentioned member and disposed in the recesses in the wheel, a third member secured to rotate with, and extending from, the first-mentioned shaft, a pin secured to the third-mentioned member and disposed between the seats and the wall of the recesses in the wheel, and a spring disposed between the collar and the wheel, for holding the first two-mentioned members yieldingly together.

12. In a transmission gearing a shaft, a wheel having recesses in one of its faces, free to rotate on the shaft, a member having projections on its opposite faces mounted on the shaft, the projections on one side of the said member being disposed in the recesses in the wheel, means for securing the member to the wheel, a second member having recesses in one of its faces in which the projections on the other face of the first-mentioned member are normally disposed, a member secured to rotate with the shaft, means connecting the second-mentioned member with the third-mentioned member, and means for holding the wheel and the second-mentioned member yieldingly with the projections on the said other face of the first-mentioned member disposed in the recesses in the second-mentioned member.

13. In a transmission gearing a shaft, a wheel having a member secured to its face mounted freely on the shaft, a second member mounted on the shaft and engaging the first-mentioned member, arms having seats secured to the second-mentioned member, a third member secured to the shaft, pins on the third-mentioned member, which are disposed in the seats in the second-mentioned member, and yielding means for holding the wheel with its member against the second-mentioned member.

In testimony whereof I have signed my name to this specification in the presence of two subscribing witnesses.

ALPHONSE MARIA LEONI.

Witnesses:
  ALDA BOROGNESI,
  CHAS. ZAGANELLI.